C. W. FORNANDER.
COMMUTATOR MOTOR.
APPLICATION FILED AUG. 26, 1911.
1,059,134.
Patented Apr. 15, 1913.
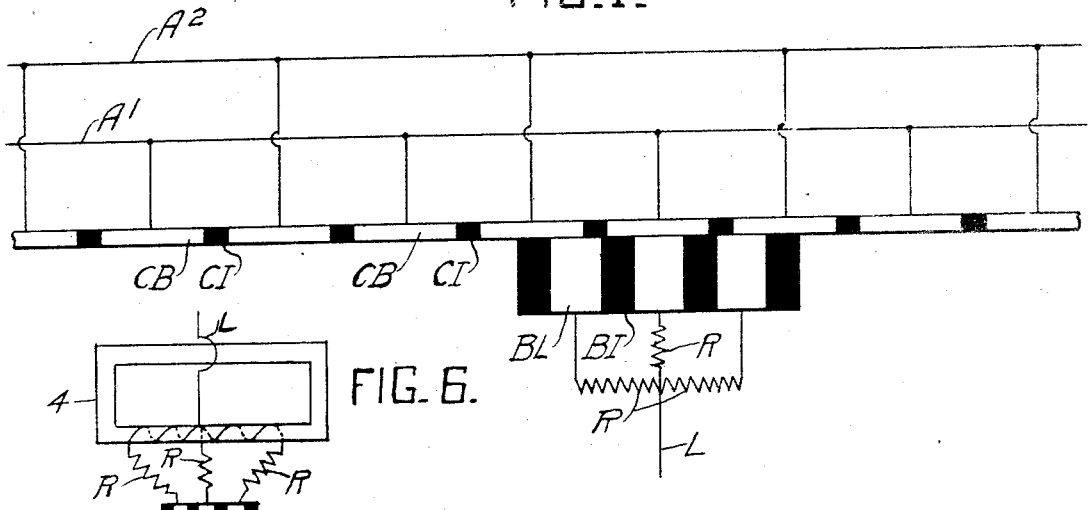
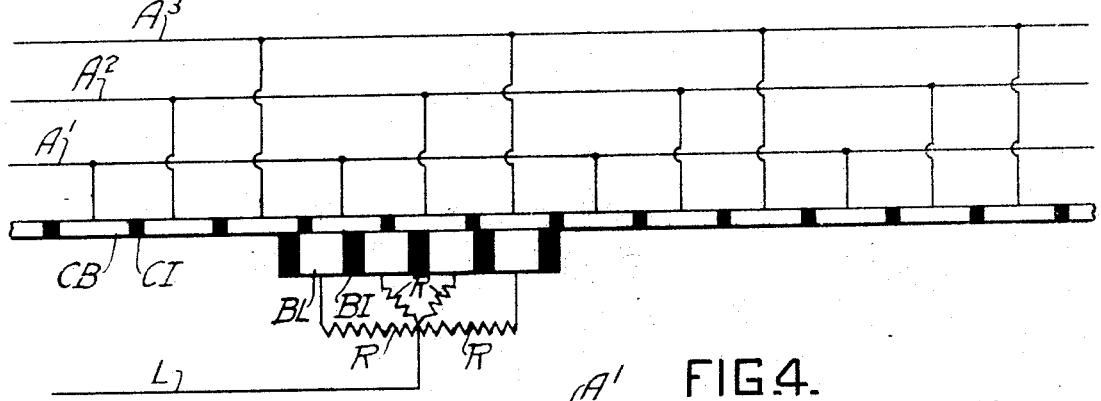
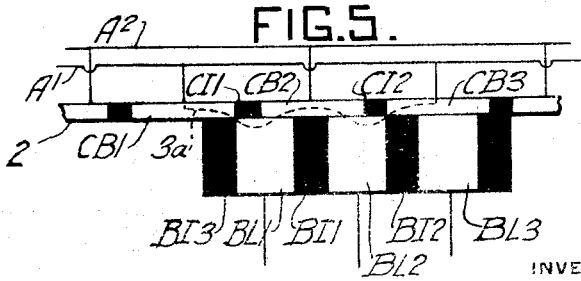
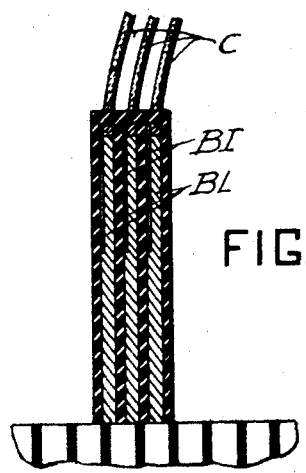
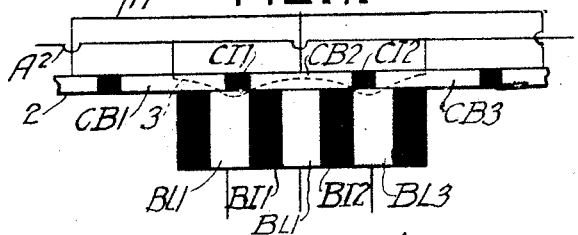
WITNESSES:
Theodore Duff
Paul N. Critchlow
INVENTOR
Carl W. Fornander,
by Christy & Christy
Attys

UNITED STATES PATENT OFFICE.

CARL W. FORNANDER, OF WILKINSBURG, PENNSYLVANIA.

COMMUTATOR-MOTOR.

1,059,134.  Specification of Letters Patent.  Patented Apr. 15, 1913.

Application filed August 26, 1911. Serial No. 646,243.

*To all whom it may concern:*

Be it known that I, CARL W. FORNANDER, residing at Wilkinsburg, in the county of Allegheny and State of Pennsylvania, a subject of the King of Sweden, have invented or discovered certain new and useful Improvements in Commutator-Motors, of which improvements the following is a specification.

My invention relates to electric motors and has to do with the construction of a brush and armature for a commutator motor, particularly a single phase commutator motor.

For various reasons, well known to those skilled in the art of electric motor construction and operation, carbon brushes have very largely displaced those made of metal, and this use of carbon in place of metal for motor brushes has (owing to the relatively high resistance of carbon) necessitated a material increase in the size of the brushes. Another feature of the modern construction of electric commutator motors is that it has been found advantageous to decrease the thickness of insulation between the commutator bars and to increase the number of bars. Owing to these changes in structure, namely the increase in the size of the brushes and the decrease in the size of commutator bars and their insulation, the brush of a motor usually extends over two or more commutator bars simultaneously, and thereby completes a short circuit, so that what is termed a "circulating-current" flows around whatever armature coils the brush bridges. To reduce such circulating currents, resistances have been placed between the commutator bars and the armature coils; but, in so much as these resistances cut down the normal operating current as well as the circulating-current, they are objectionable. The usefulness of such resistances, however, is not always limited to that of decreasing the circulating-current, for such resistances are useful in starting some types of motors, as for example a motor designed to be operated by an alternating single-phase current.

The object of my invention is to construct a brush composed of desired high resistance material, such as carbon, and having such structural relation to the commutator bars and their insulation that the resistances, heretofore spoken of, may be placed outside of the armature and within control of the operator.

My invention is illustrated in the accompanying drawing, which forms part of the specification, and in which—

Figure 1 is a diagrammatic representation of an armature and brush; Fig. 2 a view similar to Fig. 1 but showing a difference in the armature winding; Fig. 3 is an elevation of an armature brush embodying my invention and shown in its relation to a series of commutator bars, which, for convenience of illustration, are shown lying in a plane; Figs. 4 and 5 are diagrams illustrating the method of determining the proportional thickness of parts; and Fig. 6 illustrates a means for reducing an exterior circulating-current.

In the several figures like characters are used to designate like parts.

In the practice of my invention I employ a laminated brush, that is, a brush composed of alternate layers of conducting and insulating material; and I proportion the parts of the armature and brush in such manner as to eliminate all circulating-currents of the armature coils under the brush. To proportion the parts that such an end may be accomplished, five things are taken into consideration, the armature-winding, the thicknesses of commutator bars, commutator-bar insulations, brush laminæ (and by such is meant the layers of conducting material used in the construction of the brush), and brush insulations (by which is meant the layers of insulation between the brush laminæ). Of these several elements some are chosen, to best meet the practical construction of the motor and others are determined, preferably by mathematical deductions, such as will hereinafter be described. Referring to the drawing, where these elements are diagrammatically shown in their relation to each other, the commutator bars are indicated by CB, the commutator-bar insulations by CI, the brush laminæ by BL, the brush insulations by BI, and the armature winding by A', A² and A³.

Instead of using a single closed-circuit multiple winding of the armature, and connecting consecutively each commutator bar with the winding, I preferably wind the armature in such a way that adjacent bars are not electrically connected by the intervening armature winding. This end may be accomplished in several ways. First, a single winding may be used and connected to alternate commutator bars, leaving the intervening commutator bars inoperative or dead. A second and more practical way of winding the armature, so as to have adjacent commutator bars electrically ununited, is illustrated in Fig. 1 where two independent closed-circuit multiple windings A' and $A^2$ are diagrammatically shown, each winding being electrically connected to alternate commutator bars. A third armature winding is illustrated in Fig. 2 and consists of three independent windings, A', $A^2$ and $A^3$, each being connected to every third commutator bar, and it will be understood that any number of independent windings may be used in the same way as is illustrated for the double and triple windings. For each of these several forms of winding, I provide a brush, which (as heretofore stated) will eliminate the undesirable circulating-currents beneath the brushes. While I do not wish to limit, to any one specific application, my method of proportioning the thicknesses of the brush laminæ, commutator bars, and insulations for each, for the sake of illustration I prefer to describe my invention in its relation to a single-phase commutator motor wound in such a way as to have adjacent commutator bars unconnected, such as is shown in Fig. 1. And in so much as it is advantageous, owing to the resistance of carbon or compositions of similar electrical qualities, to have the laminæ as thick as possible, I will describe my invention also using such laminæ.

Referring to Figs. 4 and 5, the commutator bars $CB^1$, $CB^2$, $CB^3$, etc., of equal thickness are shown lying in a plane and separated by layers of insulation $CI^1$, $CI^2$, etc., which are also of equal thickness. Adjacent to the lower side of the commutator bars and insulations, a brush is shown consisting of laminæ of carbon $BL^1$, $BL^2$, and $BL^3$ having equal thickness and separated by equal thickness insulations $BI^1$ and $BI^2$. In the operation of the motor the commutator-bars rotate with the armature while the brushes remain practically stationary, the surface of division between the two being indicated by the line 2.

When the brush-laminæ are of less thickness than the commutator bars, but of a maximum thickness subject to the condition of preventing a circulating-current beneath the brush, two conditions must be met. The first condition is that a circulating-current must be prevented through the armature winding, connecting alternate commutator bars, when but one brush lamina is in contact with the intervening commutator bar. This condition is specifically illustrated in Fig. 4, wherein the alternate commutator bars $CB^1$ and $CB^3$ are shown connected by the armature winding $A^2$, the intervening commutator bar $CB^2$ having but one brush lamina $BL^2$ in contact with it. It will readily be seen that, when the brush lamina $BL^2$ is thinner than the commutator bar $CB^2$, in order to prevent a circulating-current flowing, as indicated by the dotted line 3, through the several conductors $CB^1$, $BL^1$, $CB^2$, $BI^3$, $CB^3$, and $A^2$, the brush insulations $BI^1$ and $BI^2$ must touch or over-lap the commutator insulations $CI^1$ and $CI^2$ respectively. The limiting arrangement will be when the outer edges of the brush insulations $BI^1$ and $BI^2$ just touch the inner edges of the commutator insulations $CI^1$ and $CI^2$ respectively, so that the first condition of preventing circulating-currents beneath the brush will be met if the parts are so proportioned that the thickness of two brush insulations plus that of one brush lamina equals the thickness of one commutator bar. Such relation may be expressed by the equation:—

(A) $\quad 2BI + BL = CB$ wherein the several terms express the thicknesses of the parts represented by them. The second condition is that circulating-currents must be prevented through the armature winding, connecting alternate commutator bars, when two brush laminæ are in contact with the intervening commutator bar. This condition is illustrated in Fig. 5, in a manner similar to the illustration (in Fig. 4) of the first condition. It will readily be seen that, when the brush laminæ are of maximum thickness subject to the afore-stated conditions of this specific illustration, the limiting arrangement to prevent circulating-currents (as indicated by the dotted line $3^a$,) through the several conductors $CB^1$, $BL^1$, $CB^2$, $BL^2$, $CB^3$ and $A^2$, will be when the interior edges of the brush insulations $BI^3$ and $BI^2$ just touch the exterior edges of the commutator insulations $CI^1$ and $CI^2$ respectively. Therefore, the second condition will be met if the parts are so proportioned that the thickness of one brush insulation plus that of two brush-laminæ is equal to the thickness of one commutator bar plus that of two commutator insulations. This relation may also be expressed by an equation, such equation being:—

(B) $\quad BI + 2BL = CB + 2CI$ wherein the several terms express the thicknesses of the parts they represent.

The equations thus formulated are algebraically independent equations and may be used as desired to determine one or two unknown quantities. For example, in designing and proportioning the parts in accordance with my invention the thickness of the commutator bars and the thickness of the commutator insulations may be chosen, and, from the two equations, the thicknesses of the brush laminæ and the brush insulations may be computed. When such a proceeding is followed and the commutator bars are accurately spaced on the armature, a maximum thickness of brush laminæ will be obtained. However, to have greater insurance against circulating-currents (in case the commutator bars are not accurately spaced) the brush insulations may be slightly thicker than the required thickness, (providing the brush laminæ are made correspondingly thinner). By like procedures similar equations may be formulated for armature windings wherein every third, fourth, etc., commutator bar is connected in series winding. And I have found such equations, when brush laminæ thinner than the commutator bars are chosen, bear a certain fixed relation to those formulated for a commutator, wherein alternate bars are connected in series. Under all conditions of winding equation (A) remains the same, while equation (B) changes for each winding, the change consisting of adding to each term of the equation the thickness of one part (represented by that term) for each additional winding to the one wherein alternate bars are connected in series. For example, when three armature windings are used, as illustrated in Fig. 2, equation (B) becomes $$2CB+3CI=3BL+2BI$$

(such being illustrated in Fig. 3); and when four armature windings are used, equation (B) becomes $$3CB+4CI=4BL+3BI, \text{etc.},$$

it being observed that the thickness of one part, represented by each term, is added to that term for each winding. Equation B may be made general for any number of armature windings by letting X represent the number of windings. When thus expressed equation B becomes:—

$$(X-1)BI+XBL=(X-1)CB+XCI.$$

By properly using these equations in conjunction with equation (A) the thickness of the desired parts may be obtained, as has been explained heretofore, for any desired armature winding.

It will be understood of my invention, thus far explained, that any desired number of brush laminæ may be used, providing they are of the required thickness and spaced evenly with the proper thickness of insulations.

In the construction of my laminated brush, each lamina may be electrically connected to the feed wire in such a manner as to reduce to a minimum the circulating-current, which, in some forms of motors, may be established from one brush lamina to another through their exterior connections to the feed wire. In Figs. 1 and 2 the means for cutting down such exterior circulating-currents are shown to consist of the ordinary ohmic resistance, such as has been heretofore used on the armature between each commutator-bar and the armature winding. In Fig. 1 the line wire L is divided into three conductors each of which is connected to a lamina of the brush through an interposed ohmic resistance R. A similar construction is shown in Fig. 2, wherein the line wire L divides into four parts, each leading to a lamina through an interposed resistance R.

An alternate means for reducing the exterior circulating-current is illustrated in Fig. 6 and is adapted to be used with or without the ohmic resistance. This alternate means consists of an iron core 4 upon which the divided feed wire L is divided and wound in the form of a coil. The feed wire will preferably be so located as to have equal portions of the coil on each side of its connection to it; the result being that, owing to the transformer action, the feed or main line current will not be reduced, while, at the same time, the circulating currents are reduced. Ohmic resistances R may also be placed in each of the divided sections of the feed line, as is shown in the drawing.

In Fig. 3 I have shown, in section, a brush constructed according to my invention and placed in operative relation to a series of commutator bars. The brush-laminæ BL are of the proper thickness (relative to the commutator bars and insulations) to prevent circulating-currents being established under the brush. These laminæ are suitably separated by insulations BI of the proper thickness as heretofore explained, and each is electrically connected to a conductor C.

It will be observed of my invention that, by placing outside of the armature the resistances to circulating-currents, the size of the armature may be much reduced, which is a very material advantage when working conditions are such that space is very valuable. Also in the practice of my invention, all circulating currents through the armature windings beneath the brushes are eliminated.

Other important advantages of my invention readily suggest themselves to those skilled in the art.

I claim herein as my invention:

In an electric motor, the combination of an armature having a commutator consisting of bars of equal thickness separated by insulation bodies of equal thickness, said armature wound with a plurality of closed circuit multiple windings each electrically connected to an equally spaced series of commutator bars, and a brush consisting of a plurality of conducting laminæ of equal thickness spaced equal distances apart; the thicknesses of the bars and the insulation laminæ of said commutator, the thicknesses of said brush laminæ, and the distance between their adjacent faces being such that: $2BI+BL$ will not be less than $CB$; and that:—$(X-1)BI+XBL$ will not be greater than $(X-1)CB+XCI$; wherein the term $BI$ represents the distance between adjacent faces of said brush laminæ, $BL$ the thickness of each brush laminæ, $CB$ the thickness of each commutator bar, $CI$ the thickness of each insulation body in said commutator, and $X$ the number of said armature windings, the said several dimensions being taken circumferentially in the contact surface of said commutator, substantially as described.

In testimony whereof I have hereunto set my hand.

CARL W. FORNANDER.

Witnesses:
 PAUL N. CRITCHLOW,
 G. G. TRILL.